(12) United States Patent
Hirose et al.

(10) Patent No.: US 8,148,439 B2
(45) Date of Patent: Apr. 3, 2012

(54) FOAMED THERMOPLASTIC RESIN PARTICLES AND METHOD OF PRODUCING THE FOAMED PARTICLES

(75) Inventors: Fuminobu Hirose, Settsu (JP); Toshio Miyagawa, Settsu (JP); Kenichi Senda, Settsu (JP)

(73) Assignee: Meredian, Inc., Bainbridge, GA (US)

( * ) Notice: Subject to any disclaimer, the term of this patent is extended or adjusted under 35 U.S.C. 154(b) by 657 days.

(21) Appl. No.: 11/909,717

(22) PCT Filed: Mar. 20, 2006

(86) PCT No.: PCT/JP2006/305529
§ 371 (c)(1),
(2), (4) Date: Jan. 16, 2009

(87) PCT Pub. No.: WO2006/103971
PCT Pub. Date: Oct. 5, 2006

(65) Prior Publication Data
US 2009/0215914 A1    Aug. 27, 2009

(30) Foreign Application Priority Data

Mar. 25, 2005 (JP) .................................. 2005-087573

(51) Int. Cl.
*C08J 9/00* (2006.01)
*C08J 9/04* (2006.01)
*C08G 63/00* (2006.01)
(52) U.S. Cl. ............................ 521/64; 521/65; 521/182
(58) Field of Classification Search .................... 521/64, 521/65, 182
See application file for complete search history.

(56) References Cited

U.S. PATENT DOCUMENTS

| | | | |
|---|---|---|---|
| 5,310,872 A | 5/1994 | Takahashi et al. | |
| 6,110,983 A | 8/2000 | Tokoro et al. | |
| 6,130,266 A | 10/2000 | Mihayashi et al. | |

FOREIGN PATENT DOCUMENTS

| | | | |
|---|---|---|---|
| EP | 1275687 A2 | 1/2003 |
| EP | 1378538 A1 | 1/2004 |
| JP | 06-248106 A | 9/1994 |
| JP | 10-505620 A | 6/1998 |
| JP | 10-324766 A | 12/1998 |
| JP | 2000-226466 A | 8/2000 |
| JP | 2000-319438 A | 11/2000 |
| JP | 2001-049021 A | 2/2001 |
| JP | 2001-106821 A | 4/2001 |
| JP | 2001-213991 A | 8/2001 |
| JP | 2001-288294 A | 10/2001 |
| JP | 2002-096323 A | 4/2002 |
| JP | 2002-121312 A | 4/2002 |
| JP | 2002-187972 A | 7/2002 |
| JP | 2003-003001 A | 1/2003 |
| JP | 2003-003002 A | 1/2003 |
| JP | 2003-82150 A | 3/2003 |
| JP | 2003-321568 A | 11/2003 |
| JP | 2003-327737 A | 11/2003 |
| JP | 2004-143269 A | 5/2004 |
| JP | 2004-269583 A | 9/2004 |

OTHER PUBLICATIONS

Machine translation of JP2000-319438.*
Machine translation of JP2003-082150.*
Machine translation of JP2003-321568.*
Extended European Search Report dated Jan. 29, 2010, issued in European Patent Application No. 06729497.5-2102.

* cited by examiner

*Primary Examiner* — Timothy J. Kugel
(74) *Attorney, Agent, or Firm* — Sughrue Mion, PLLC

(57) ABSTRACT

It is intended to provide resin foamed particles having a high environmental compatibility. Furthermore, it is intended to provide an economical and easy-to-use method of producing resin foamed particles having biodegradability without using a crosslinking agent, which should be handled with care, in the step of producing foamed resin particles. It is also intended to provide a molded article made of foamed particles having an extremely high heat insulating property and a biodegradability. Thermoplastic polyester-type resin foamed particles, in which the ratio of cells with diameter of 50 μm or less amounts to 20% or more in an arbitrary two-dimensional section of a thermoplastic polyester-type resin foamed particles, are first produced and then a molded article is produced with the use of these resin foamed particles.

12 Claims, No Drawings

FOAMED THERMOPLASTIC RESIN PARTICLES AND METHOD OF PRODUCING THE FOAMED PARTICLES

CROSS REFERENCE TO RELATED APPLICATIONS

This application is a National Stage of International Application No. PCT/JP2006/305529 filed on Mar. 20, 2006, claiming priority based on Japanese Patent Application No. 2005-087573, filed Mar. 25, 2005.

TECHNICAL FIELD

The present invention relates to thermoplastic polyester-based resin foamed particles. Further, the invention relates to a molded product of the thermoplastic polyester-based resin foamed particles which is excellent in thermal insulation property and fusibility of the foamed particles. Moreover, the invention relates to the foamed particles which can be obtained economically and stably without a crosslinking step, and a method of producing the same.

BACKGROUND ART

In recent years, under current circumstances in which environmental issues caused by waste plastics have been focused, biodegradable plastics, particularly aliphatic polyester resins and aliphatic-aromatic polyester-based resins, which are degraded after use into water and carbon dioxide by the action of a microorganism have drawn attention. Sheets, films, fibers, molded products and the like have been already put into commercialization of the products both domestically and abroad. Among plastic waste, however, foamed plastics which have been used for packaging containers, shock absorbers, cushioning materials and the like in large quantities have raised big social problems because of bulkiness, and thus solution thereof has been desired.

Therefore, researches on foamed plastics which exhibit biodegradability have been extensively conducted. Thus far, extruded foam of aliphatic polyester-based resins, mixed resins of starch and a plastic and the like have been developed, and started to be put into practical applications in part. Furthermore, also in the field of beads expansion in mold, generally referred to, in which foamed particles are produced once, and they are then filled in a mold followed by heating to obtain a foamed and molded product, the following techniques were developed with respect to the aliphatic polyester-based resin foamed particles.

According to Japanese Unexamined Patent Application Publication No. Hei 6-248106, a method has been known in which: aliphatic polyester particles obtained by increasing the molecular weight of an aliphatic polyester prepolymer through allowing to react with diisocyanate as a coupling agent are impregnated with a volatile foaming agent to give foamed particles; thereafter the particles are heated with heat water vapor to obtain preliminary expanded particles; and then they are placed in a mold and expanded while heating to obtain a molded product. This method raises problems of complicated steps and high cost due to involvement of the reaction step of diisocyanate, and further, only a product exhibiting a great percentage of contraction in molding could be obtained. Additionally, there is disclosed a technique of aliphatic polyester-based resin foamed particles with specified gel content by subjecting to a crosslinking treatment, and a molded product of the same (for example, see Japanese Unexamined Patent Application Publication No. Hei 10-324766), and the technique being excellent in formability with a lower molding percentage of contraction than that in the technique disclosed in Japanese Unexamined Patent Application Publication No. Hei 6-248106. However, since satisfactory product can be obtained in just a narrow range, improvement of the extent of gelation has been investigated (for example, see Japanese Unexamined Patent Application Publication No. 2001-49021, No. 2001-106821 and No. 2001-288294). These methods have enabled formation of a molded product of the foamed particles with low percentage of contraction in molding at a low density, however, addition of the crosslinking step further makes the steps more complicated, leading to deteriorated productivity and economical disadvantage. In addition, the molded products of the aliphatic polyester-based resin foamed particles obtained in such a manner were accompanied by problems of inferior product fusibility, and easy detachment at the interface of the foamed particles.

Meanwhile, JP-T (the term "JP-T" as used herein means a published Japanese translation of a PCT application) No. Hei 10-505620 also discloses a biodegradable aliphatic-aromatic polyester copolymer, and further defines a foamed and molded member as the molded product. However, this document does not clarify whether the foamed and molded member is an extruded foam or foamed beads, and still further, specific description for obtaining the foamed particles and molded product of the foamed particles at all. Moreover, in Japanese Unexamined Patent Application Publication No. Hei 10-324766, No. 2001-49021, No. 2001-106821 and No. 2001-288294, the aliphatic polyester-based resin is defined as a polymer including aliphatic ester bonds at a percentage of 60% by mole or more in the main chain (in Japanese Unexamined Patent Application Publication No. 2002-96323, No. 2002-121312 and No. 2002-187972, the percentage in the definition is referred to as 35% by mole), and a polyester resin which is poly(butylene adipate/terephthalate) obtained from aromatic dicarboxylic acid, aliphatic dicarboxylic acid, aliphatic diol as described in the aforementioned JP-T No. Hei 10-505620 is illustrated. Specific examples of the foamed particles prepared by the use of an aliphatic-aromatic polyester copolymer as a base resin are illustrated in Japanese Unexamined Patent Application Publication No. 2003-3001, and No. 2003-3002, however, almost all of these were studied with essential need of a crosslinking treatment. Thus, the foamed particles, their molded product, and method of producing the same were not substantially studied with respect to a polyester copolymer prepared without subjecting to, in particular, a crosslinking treatment. Additionally, descriptions about cell diameter are found in these documents, stating that when foamed particles having a cell diameter of equal to or greater than 50 μm, and preferably equal to or greater than 80 μm are not obtained, the molding is failed because the cell membrane is broken during the molding.

On the other hand, in connection with non-crosslinked and foamed particles and molded product of the foamed particles, the present applicant proposed the use of an ethylene-propylene random copolymer resin (for example, see Japanese Unexamined Patent Application Publication No. 2000-226466), the use of a poly(3HB-co-3HH)-based aliphatic polyester resin as a base resin (for example, see Japanese Unexamined Patent Application Publication No. 2000-319438), the use of an aliphatic-aromatic polyester copolymer as a base resin (for example, see Japanese Unexamined Patent Application Publication No. 2004-143269), and the like. In investigation of these polyester resin foamed particles and their molded product, cell diameter was not specifically studied. However, the polyester resin foamed particles disclosed in these documents had an occupancy rate of the cell diameter of equal to or less than 50 μm in an arbitrary two-dimensional cross section being less than 20%.

Thermal insulation property is included in characteristics as a foam, and it is important in energy saving of a variety of economic activities taking account of prevention of global warming. Conventional olefin-based molded product of the foamed particles had a comparatively high thermal conductivity of 0.041 W/mK or more (Comprehensive List of Foamed Plastics Techniques, 1989, Shin Takahashi, p. 158). Because a cell diameter-dependent suppressive effect of the radiant heat is involved in thermal conductivity, investigation of the cell diameter is important.

DISCLOSURE OF THE INVENTION

An object of the present invention is to provide an economic and easy-to-use method of producing without need of a crosslinking agent which requires care in handling in steps of producing the foamed particles. In addition, further object is to provide a molded product of the foamed particles which is extremely excellent in thermal insulation properties. Yet another object is to obtain resin foamed particles that are excellent in environmental compatibility such as favorable energy efficiency in use for various members owing to excellent thermal insulation properties, and further, provided are the resin foamed particles having biodegradability.

The present inventors elaborately investigated in an attempt to solve the aforementioned problems, and consequently found that a molded product of the foamed particles that can be molded with foamed particles having a cell diameter of equal to or less than 50 μm, which had been conventionally conceived impossible in molding of the foamed particles, and that is more excellent in thermal insulation property than conventional molded product of the foamed particles can be obtained. Accordingly, the present invention was accomplished. Moreover, they found a method of producing foamed particles having a cell diameter of the foamed particles being equal to or less than 50 μm, and thus the present invention was accomplished.

More specifically, a first aspect of the present invention relates to a thermoplastic polyester-based resin foamed particle having an occupancy rate of the cell diameter of equal to or less than 50 μm in an arbitrary two-dimensional cross section of the thermoplastic polyester-based resin foamed particle being equal to or greater than 20%. In a preferred embodiment, the invention relates to a thermoplastic polyester-based resin foamed particle having an occupancy rate of the cell diameter of equal to or less than 50 μm in an arbitrary two-dimensional cross section of the thermoplastic polyester-based resin foamed particle being equal to or greater than 50%.

More preferably, in the aforementioned thermoplastic polyester-based resin foamed particles, the thermoplastic polyester-based resin is a thermoplastic polyester-based resin (X) predominantly comprising a copolymer (x) obtained by polymerization of (a) a compound containing an alkane carboxylic acid and/or an ester-forming derivative of the alkane carboxylic acid, (b) a compound containing an aromatic carboxylic acid and/or an ester-forming derivative of the aromatic carboxylic acid and (c) an alkane diol compound (c); still more preferably, in the thermoplastic polyester-based resin foamed particles, the compound (a) is adipic acid and/or an ester-forming derivative of adipic acid, the compound (b) is terephthalic acid and/or an ester-forming derivative of terephthalic acid, and the compound (c) is butanediol; particularly preferably, in the thermoplastic polyester-based resin foamed particles, the copolymer (x) is a thermoplastic polyester-based resin comprising a monomer (x1) that imparts a branched structure and/or a chain extender (x2); in the thermoplastic polyester-based resin foamed particles, the thermoplastic polyester-based resin comprising a copolymer having a recurring unit represented by the general formula (1):

$$[-CHR-CH_2-CO-O-] \qquad (1)$$

(wherein, R is an alkyl group represented by $C_nH_{2n+1}$; and n is an integer of 1 to 15) produced from a microorganism (hereinafter, referred to as poly(3-hydroxyalkanoate)); more preferably in the thermoplastic polyester-based resin foamed particles, P3HA is poly(3-hydroxybutyrate-co-3-hydroxyhexanoate) having a recurring unit in which n=1 and 3; and particularly preferably, in the thermoplastic polyester-based resin foamed particles, composition ratio of the copolymerizing components is poly(3-hydroxybutyrate)/poly(3-hydroxyhexanoate)=99/1 to 80/20 (molar ratio).

A second aspect of the present invention relates to a molded product of the foamed particles obtained by heat molding of the thermoplastic polyester-based resin foamed particles. In preferable embodiments, the invention relates to the molded product of the foamed particles having a thermal conductivity of equal to or less than 0.040 W/mK. More preferably, the invention relates to the molded product of the foamed particles having a thermal conductivity of equal to or less than 0.034 W/mK.

A third aspect of the present invention relates to a method of producing the thermoplastic polyester-based resin foamed particles comprising: a step of dispersing thermoplastic polyester-based resin particles in a water-based dispersion medium in an airtight vessel together with a dispersant; a step of feeding a foaming agent into the airtight vessel after the dispersion, followed by heating the resin particles to not lower than the softening temperature thereof; and a step of opening one end of the airtight vessel after the heating so as to release the resin particles and the water-based dispersion medium to an atmosphere with a pressure lower than the pressure in the airtight vessel.

BEST MODE FOR CARRYING OUT THE INVENTION

Hereinafter, the present invention will be explained in more detail. In order for the thermoplastic polyester-based resin foamed particles of the present invention having an excellent thermal insulation property, an occupancy rate of the cell diameter of equal to or less than 50 μm in an arbitrary two-dimensional cross section of the particle is equal to or greater than 20%. In light of the heat insulating effect, the occupancy rate of the cell diameter of equal to or less than 50 μm is more preferably equal to or greater than 50%, and still more preferably equal to or greater than 70%. In the document referred to in Background Art, there is described that the mean cell diameter of equal to or less than 50 μm results in breakage of the cell membrane to yield a low rate of independent cells, and thus the molded products cannot be formed from such foamed particle. On the contrary, molding can be perfected even though the cell diameter is equal to or less than 50 μm according to the thermoplastic polyester-based resin foamed particles of the present invention. When the occupancy rate of the cell diameter of equal to or less than 50 μm in an arbitrary two-dimensional cross section of the thermoplastic polyester-based resin foamed particle is less than 20%, the suppressive effect of the radiant heat by the cell membrane is hardly achieved to yield elevated thermal conductivity, whereby advantages are likely to be impaired as compared with conventional molded product of the foamed particles in the case of use as a heat insulating material. In contrast, when the occupancy rate of the cell diameter of equal to or less than 50 μm is equal to or greater than 50%, extremely favorable heat insulation characteristics are likely to be exhibited.

It is preferred that the thermoplastic polyester-based resin foamed particles having the cell diameter as described above are constituted from the thermoplastic polyester-based resin (X). Examples of the thermoplastic polyester-based resin (X) include resins predominantly comprising a copolymer (x) obtained by polymerization of (a) a compound containing an alkane carboxylic acid (aliphatic carboxylic acid) and/or an ester-forming derivative of the alkane carboxylic acid, (b) a compound containing an aromatic carboxylic acid and/or an ester-forming derivative of the aromatic carboxylic acid and (c) an alkane diol (aliphatic diol) compound (c). The term "predominantly comprising" referred to herein means that the copolymer (x) in an amount of 50% by weight or more, and more preferably 80% by weight or more is included in the thermoplastic polyester-based resin (X).

The compound (a) is preferably adipic acid and/or an ester-forming derivative of adipic acid, and more preferably alkyl adipate having 1 to 6 carbon atoms (dimethyl adipate, diethyl adipate, dipropyl adipate, dipentyl adipate, dihexyl adipate), and adipic acid.

The compound (b) is preferably terephthalic acid and/or an ester-forming derivative of terephthalic acid, and more preferably dialkyl terephthalate having 1 to 6 carbon atoms (dimethyl terephthalate, diethyl terephthalate, dipropyl terephthalate, dipentyl terephthalate, dihexyl terephthalate), and terephthalic acid.

The compound (c) is preferably an alkane diol having 2 to 6 carbon atoms, more preferably ethylene glycol, 1,2- and 1,3-propanediol, 1,2- and 1,4-butanediol, 1,5-pentanediol, 1,6-hexanediol, still more preferably 1,3-propanediol, and 1,4-butanediol, and particularly preferably 1,4-butanediol.

It is preferred that the composition ratio of the compounds (a), (b) and (c) constituting the copolymer (x) be (compound (a)/compound (b))/compound (c)=(0 to 50/50 to 0)/50.

The copolymer (x) obtained from the compounds (a), (b) and (c) is preferably a copolymer (abbreviation: PBAT) of polybutylene terephthalate with polybutylene adipate composed of constitutional units of butylene adipate (a-c) and butylene terephthalate (b-c) in light of biodegradability, wide thermal processing temperature region, heat resistance, and hydrolysis resistant flexibility.

It is preferred that in the polyester-based resin (X) constituting the thermoplastic polyester-based resin foamed particles of the present invention, a monomer having a polyfunctional group to impart a branched structure, and/or having a function to allow the main chain to bind or elongate is added as a third component to the copolymer (x), thereby permitting the polymerization to give an adequate melt viscosity and molecular weight. As the third component added to the copolymer (x), a monomer (x1) that imparts a branched structure, and/or a chain extender (x2) is preferred. The monomer (x1) that imparts a branched structure is preferably a monomer including 3 to 6 functional groups that enable the ester bond to be formed, and particularly preferably a monomer having 3 to 6 hydroxyl groups and/or carboxyl groups. Examples of the monomer (x1) include e.g., tartaric acid, citric acid, malic acid; trimethylolpropane, trimethylolethane; pentaerythrite; polyethertriol; glycerin; trimesic acid; trimellitic acid, trimellitic anhydride; pyromellitic acid, pyromellitic anhydride; hydroxyisophthalic acid, and the like. Additionally, for example, diisocyanate, diepoxy compound, acid anhydride, bisoxazoline or the like can be used as the chain extender (x2). Illustrative examples of diisocyanate include 2,4-tolylene diisocyanate, mixtures of 2,4-tolylene diisocyanate and 2,6-tolylene diisocyanate, diphenyl methane diisocyanate, 1,5-naphthylene diisocyanate, xylylene diisocyanate, hydrogenated xylylene diisocyanate, hexamethylene diisocyanate, isophorone diisocyanate, and the like. Illustrative examples of bisoxazoline include 2,2'-bis(2-oxazoline), bis(2-oxazolinyl)methane, 1,2-bis(2-oxazolinyl) ethane, 1,3-bis(2-oxazolinyl)propane, 1,4-bis(2-oxazolinyl) butane, 1,4-bis(2-oxazolinyl)benzene, 1,2-bis(2-oxazolinyl) benzene, 1,3-bis(2-oxazolinyl)benzene and the like. Moreover, the reaction of, for example, the copolymer (x) and bisoxazoline is advantageously carried out in a molten matter. In this reaction, care should be taken so as not to cause a side reaction as less as possible which can possibly lead to crosslinking or gel formation. In an embodiment, the reaction is carried out at a temperature within the range of usually 120 to 260° C., preferably 130 to 240° C., and more preferably 140 to 220° C. Addition of bisoxazoline in this reaction may be advantageously conducted either repeated batch-wise or continuously. These monomer (x1) that imparts the branched structure, and chain extender (x2) are not limited to those described above, and any one can be used as long as a cross-linked structure or gel formation is not accompanied. The amount of addition of the monomer (x1) that imparts the branched structure, and the chain extender (x2) is preferably 0.1 to 5 parts by weight, respectively, based on 100 parts by weight of the copolymer (x). When the amount is less than 0.1 parts by weight, the effect achieved by the addition may be insufficient, whereas the amount exceeding 5 parts by weight may cause crosslinking whereby the gel may be readily formed.

The amount of the compound (b) as a constitutive monomer component in the thermoplastic polyester-based resin (X) included in the thermoplastic polyester-based resin foamed particles of the present invention is preferably 35 to 65% by mole based on the total amount of the acid component monomer. When the compound (b) is less than 35% by mole, problems such as insufficient heat resistance are likely to be raised, whereas the amount more than 65% by mole may hardly achieve satisfactory biodegradability. The biodegradability referred to herein means a characteristic of degradability by a microorganism finally yielding carbon dioxide gas and water.

As described above, suitable thermoplastic polyester-based resin (X) constituting the thermoplastic polyester-based resin foamed particles of the present invention is a copolymer (PBAT) of polybutylene adipate and polybutylene terephthalate, and examples thereof include "Ecoflex (registered trademark)" manufactured by BASF, "EASTAR BIO (registered trademark)" manufactured by Eastman Chemical, "Enpol G8060" manufactured by IRe CHEMICAL, and the like. According to a document "Green Plastic Leading-edge Technology: P257-258" (supervising editor: Yoshio Inoue, CMC Publication), the monomer (x1) that imparts a branched structure and the chain extender (x2) are reported to be used in the aforementioned "Ecoflex (registered trademark)".

Poly(3-hydroxyalkanoate) (hereinafter, referred to as P3HA) of the present invention is an aliphatic polyester that has a repeat structure consisting of 3-hydroxyalkanoate represented by the general formula (1):

$$[-CHR-CH_2-CO-O-] \quad (1)$$

(wherein, R is an alkyl group represented by $C_nH_{2n+1}$, and n is an integer of 1 to 15), and that is produced from a microorganism.

Exemplary P3HA according to the present invention may be a homopolymer of the aforementioned 3-hydroxyalkanoate, or a copolymer prepared from a combination of two or more hydroxyalkanoate such as di-copolymer, tri-copolymer, tetra-copolymer or the like, or a blend of two or more selected from these homopolymers, copolymers and the like. Among them, those which can be preferably used include homopolymers such as 3-hydroxybutyrate having n of 1,3-hydroxyvalylate having n of 2,3-hydroxyhexanoate having n of 3,3-hydroxyoctanoate having n of 5, and 3-hydroxyoctadecanoate having n of 15 or copolymers constituted with a combination of two or more of these 3-hydroxyalkanoate units in which n is different, or blends of the same. Among them, P3HA is more preferably poly(3-hydroxybutyrate-co-3-hydroxyhexanoate) that is a copolymer of 3-hydroxybutyrate having n of 1 and 3-hydroxyhexanoate having n of 3, in light of biodegradability, heat resistance, and a comparably wide range of the temperature applicable in the thermal processing. Further, the composition ratio is preferably 3-hydroxybutyrate/3-hydroxyhexanoate=99/1 to 80/20 (molar ratio), more preferably 3-hydroxybutyrate/3-hydroxyhexanoate=98/2 to 82/18 (molar ratio), and particularly preferably 3-hydroxybutyrate/3-hydroxyhexanoate=98/2 to 85/15 (molar ratio). When the 3-hydroxybutyrate/3-hydroxyhexanoate composition ratio exceeds 99/1, less difference in melting point is present from the melting point of poly(3-hydroxybutyrate) that is a homopolymer, whereby a thermal processing at a high temperature is needed, which may lead to striking lowering of the molecular weight due to thermal degradation during the thermal processing, whereby control of the quality may be difficult. In addition, when the 3-hydroxybutyrate/3-hydroxyhexanoate composition ratio is less than 80/20, productivity may be deteriorated because a long period of time is required for recrystallization during the thermal processing.

To the thermoplastic polyester-based resin (X) in the present invention may be added various additives in the range not to impair performance requirement of the resulting foamed particles. As the additive, an antioxidant, an ultraviolet ray absorbing agent, a colorant such as dye and pigment, a plasticizer, a lubricant, a crystallization nucleating agent, an inorganic fillers, and the like can be used depending on the object, but among all, additives having biodegradability are preferred. Examples of the additive include inorganic compounds such as silica, talc, calcium silicate, wollastonite, kaolin, clay, mica, zinc oxide, titanium oxide and silicon dioxide, fatty acid metal salts such as sodium stearate, magnesium stearate, calcium stearate and barium stearate, liquid paraffin, olefin-based wax, stearylamide-based compounds, but not limited thereto. In addition, the cell diameter of the foamed particles must be regulated to be equal to or less than 50 μm. As one method to give such a cell diameter, a process to add a cell regulator may be exemplified. Examples of the cell regulator include inorganic agents such as talc, silica, calcium silicate, calcium carbonate, aluminum oxide, titanium oxide, diatomaceous earth, clay, sodium bicarbonate, alumina, barium sulfate, aluminum oxide, bentonite, and the like. It may be added in an amount of preferably 0.005 to 10 parts by weight, and more preferably 0.01 to 5 parts by weight per 100 parts by weight of the thermoplastic polyester-based resin (X) such that the cell diameter falls within the range according to the present invention. When the foaming agent per se has a cell nuclear forming ability, the amount of addition may be adjusted appropriately.

The thermoplastic polyester-based resin foamed particles of the present invention are obtained by heat fusion and kneading of a polyester-based resin as a base resin with an extruder a kneader, a banbury mixer, a roll or the like first, and then molding into a particle shape which can be readily utilized in the foaming of the present invention such as a cylindrical, elliptic cylindrical, spherical, cubic, or rectangular prism shape. The weight of one particle may be 0.1 to 20 mg, and is preferably 0.5 to 10 mg. When the weight of one particle is less than 0.1 mg, production of the particle itself may be difficult, while nonuniform impregnation, nonuniform foaming and the like may be likely to be caused depending on selection of the foaming agent described later when the weight is beyond 20 mg.

After dispersing thus resulting thermoplastic polyester-based resin particles together with a dispersant into a dispersion medium in an airtight vessel, the foaming agent is fed into the airtight vessel, the thermoplastic polyester-based resin foamed particles are produced by: heating to a temperature not lower than the softening temperature of the polyester-based resin particle and not higher than the temperature at which they get into a completely amorphous state; and keeping at around a temperature to allow for expansion if necessary for a given period of time (referred to as holding time), followed by opening one end of the airtight vessel so as to release the polyester-based resin particles and the dispersion medium to an atmosphere with a pressure lower than the pressure in the airtight vessel. Furthermore, the thermoplastic polyester foamed particles obtained in such a manner have a crystal structure showing two or more melting points on a DSC curve according to a differential scanning calorimetry method.

The temperature and pressure in the airtight vessel may be selected appropriately depending on the type of the used resin particles and foaming agent, and for example, it is preferred that the temperature is not higher than the melting point of the used resin particles, and the pressure is at least 0.5 MPa or higher.

As the dispersant, an inorganic substance such as tribasic calcium phosphate, calcium pyrophosphate, kaolin, basic magnesium carbonate, aluminum oxide or basic zinc carbonate, and an anionic surfactant such as sodium dodecylbenzenesulfonate, sodium α-olefinsulfonate, sodium n-paraffinsulfonate or the like may be used alone or in combination. The amount of the added dispersant can be adjusted appropriately such that resin particles in the airtight vessel can be prevented from fusion of each other. Moreover, the dispersion medium is preferably water, in general, in light of economical aspects, and handling characteristics, however, in this case, influences from basicity upon dissolution of the aforementioned various additive into water, and from the dispersant must be considered. Also in the case of thermoplastic polyester-based resins that are excellent in hydrolysis resistance, hydrolysis of the thermoplastic polyester-based resin may be significantly accelerated with the dispersion medium other than neutral hot water.

Moreover, examples of the foaming agent include saturated hydrocarbons having 3 to 5 carbon atoms such as propane, n-butane, isobutane, n-pentane, isopentane and neopentane, ethers such as dimethyl ether, diethyl ether and methylethyl ether, halogenated hydrocarbons such as monochloromethane, dichloromethane and dichlorodifluoroethane, inorganic gas such as carbon dioxide, nitrogen and air, water and the like. These may be used alone, or in combination of two or more. Taking into consideration the environmental compatibility, the foaming agents except for halogenated hydrocarbons are preferred. Among these, saturated hydrocarbons having 3 to 5 carbon atoms are preferred, and isobutane is more preferred because of low cost, ease in handling, and an effect to improve the thermal insulation property which may be exhibited by the foaming agent remaining in the foamed particle. The amount of addition of the foaming agent varies depending on expansion ratio of intended preliminary foamed particles, type of the foaming agent, type of the polyester-based resin, proportion of the resin particles and the dispersion medium, void volume of the vessel, impregnation/foaming temperature, and the like, but it is usually 2 to 10000 parts by weight, more preferably 5 to 5000 parts by weight, and still more preferably 10 to 1000 parts by weight per 100 parts by weight of the resin particles. When the amount of the foaming agent is less than 2 parts by weight, sufficient expansion ratio may not be achieved. In contrast, when the amount of the foaming agent exceeds 10000 parts by weight, an effect to meet the surplus amount cannot be achieved, which may lead to economic waste.

One exemplary method for obtaining the foamed particles including cells not exceeding 50 μm of the present invention may be a method in which the foaming agent in an excess amount of the resin is used, and the adjustment can be executed appropriately by combination with the amount of addition of the cell regulator, and the like.

The thermoplastic polyester-based resin foamed particles of the present invention has a thermal conductivity of preferably equal to or less than 0.040 W/mK, and more preferably equal to or less than 0.034 W/mK. The value of the lower limit of the thermal conductivity is not particularly limited, and it is preferably as low as possible.

It is preferred that the thermoplastic polyester-based resin foamed particles of the present invention have a crystal structure showing two or more melting points on a DSC curve according to preferably a differential scanning calorimetry method. The differential scanning calorimetry method of the thermoplastic polyester-based resin foamed particle of the present invention is carried out according to, for example, a method disclosed in Japanese Unexamined Patent Application Publication No. S59-176336, No. S60-49040 and the like, in which a DSC curve is obtained by elevating the temperature from 0° C. to 200° C. at a rate of temperature rise of 10° C./min with a differential scanning calorimeter. The melting point referred to herein means a temperature of the peak on an endothermic curve on the DSC curve in elevating the temperature. When the thermoplastic polyester-based resin foamed particles having a crystal structure with two or more melting points on the DSC curve are filled in a mold to perfect molding, a molded product with favorable physical properties are obtained under molding conditions which may fall within wide ranges. The difference between two melting points is preferably equal to or greater than 2° C., more preferably equal to or greater than 10° C., and the greater the difference in the melting point temperatures is, the more favorable formability that can be achieved is.

Thus resulting foamed particles of the present invention has an expansion ratio of preferably 2 to 80 times, and more preferably 5 to 60 times. When the expansion ratio is less than two times, thermal insulation property and weight saving effect being the characteristics of foamed products tend to be hardly achieved. In contrast, when the ratio exceeds 80 times, the molding can be carried out only under extremely limited heat molding conditions.

The thermoplastic polyester-based resin foamed particles obtained by the method described above can be if necessary, compressed with compression air to increase the inner pressure (treatment with internal pressure), and filled in a mold which can be closed but not airtightly. Subsequently, water vapor is introduced into the mold, and the thermoplastic polyester-based resin foamed particles are heated and fused with each other to produce a foamed and molded product of the thermoplastic polyester-based resin foamed particles.

The thermoplastic polyester-based resin foamed particles obtained by the method described above, or, the molded products of the same can be used for applications such as packaging materials, materials for tableware, building materials, civil engineering materials, agricultural materials, horticultural materials, automobile interior materials, materials for adsorption, carrier and filtration, and the like.

EXAMPLES

Examples are demonstrated below to explain the present invention in more detail, but the present invention is not anyhow limited to these Examples. In Examples, "part" is based on the weight. In addition, terms in connection with the resin used in the present Examples are abbreviated as in the following:

PBAT: polybutylene adipate-co-terephthalate
PHBH: poly(3-hydroxybutyrate-co-3-hydroxyhexanoate)
HH rate: molar fraction (% by mole) of hydroxyhexanoate in PHBH Measurement of physical properties of the thermoplastic polyester-based resin foamed particles and molded products in each Example was carried out as follows.

<Productivity of Thermoplastic Polyester-Based Resin Foamed Particles>

Productivity of the foamed particles was evaluated according to the following standards.

A: the case without including a crosslinking step
C: the case including a crosslinking step <Occupancy Rate of Cell Diameter of Equal to or less than 50 μm of Thermoplastic Polyester-Based Resin Foamed Particles>

Occupation area ratio per cross sectional area of the cell having a cell diameter of equal to or less than 50 μm (hereinafter, small cell area ratio) was determined as follows. The cell having a cell diameter of equal to or less than 50 μm herein means a cell having a diameter of a corresponding circle being equal to or less than 50 μm. The foamed particle is arbitrarily cut, and the image of the foam in one cross section thereby obtained is taken by a scanning electron microscope (manufactured by Hitachi, Ltd., SEMEDEX type N) at magnification of 30 times. On the photograph printed out following the imaging was placed an OHP sheet, and parts corresponding to the cell having a cell diameter greater than 1.5 mm (corresponding to the cell having an actual size exceeding 50 μm) are marked out with a black ink thereon (primary treatment). The primary processed image is captured in an image processing apparatus (manufactured by Pierce, item number: PIAS-II), dark-colored part and light-colored part, i.e., whether or not the black ink was applied on the part, are discriminated (binarization). Using "FRACTA-REA (area rate)" in a computing facility for analyzing the image, the area ratio of the cell having a diameter of equal to or less than 1.5 mm (binarized light-colored part) occupying in the entire image is determined by the following formula:

Small cell occupancy area ratio (%)=(1−area of the dark-colored part/area of the entire image)×100.

<Expansion Ratio of Thermoplastic Polyester-Based Resin Foamed Particles>

A graduated cylinder charged with ethanol at 23° C. is provided, and to the graduated cylinder were placed 500 or more foamed particles (weight of the foamed particles: W (g)), which had been left to stand under a condition with relative humidity of 50%, at 23° C. and 1 atm for 7 days, to allow them to submerge using a wire mesh or the like. Provided that the volume of the foamed particles read from the elevated ethanol level is defined as V (cm³), the expansion ratio is determined with a resin density ρ (g/cm³) according to the following formula:

Expansion ratio=V/(W/ρ).

<Melting Point of Thermoplastic Polyester-Based Resin Foamed Particles>

Differential scanning calorimetry is carried out by precisely weighing about 5 mg of the foamed particles, and elevating the temperature from 0° C. to 200° C. at a rate of temperature rise of 10° C./min with a differential scanning calorimeter (manufactured by Seiko Electronics Co., Ltd., SSC5200) to obtain a DSC curve. Accordingly, the peak temperature on the endothermic curve was determined. The peak temperature on the high temperature side was defined as $Tm^1$, and the peak temperature on the low temperature side was defined as $Tm^2$.

<Expansion Ratio of Molded Product>

The weight of the molded product, and the volume of the molded product were determined, and the expansion ratio was determined according to the following formula.

Expansion ratio of molded product=(volume of the molded product/weight of the molded product)× resin density <Formability: Fusibility>

A cut was made in the molded product, which was bent and broken. The cross section was observed, and evaluated according to the following standards.

A: percentage of the broken section in the foamed particle boundary surface being 60% or more; and C: percentage of the broken section in the foamed particle boundary surface being less than 60%.

<Thermal Insulation Property: Thermal Conductivity>

In accordance with JISA9511, the thermal conductivity was measured with a thermal conductivity tester HC-072 (manufactured by EKO Instruments Co., Ltd.).

Biodegradability of Resin

Six months after burying each resin, which had been processed to give a plate of 10 cm×10 cm×0.2 m, 10 cm under the ground, change in the shape was observed to evaluate the degradability according to the following standards:

A: substantial part degraded, showing degradation to the extent that the shape can be hardly identified; and C: almost no change in the shape, showing no degradation.

Example 1

Talc in an amount of 0.01 parts as a cell regulator was dry blended with 100 parts by weight of polybutylene adipate-terephthalate (manufactured by BASF "Ecoflex (registered trademark)": melting point presented in the catalog: 110 to 115° C.) obtained by polycondensation of adipic acid and terephthalic acid, and 1,4-butanediol. Thereafter, the blend was melt-kneaded with a φ35 mm single screw extruder (manufactured by Kasamatsu Kako Kenkyusho Inc., universal extruder for laboratory use) equipped with a kneader at a cylinder temperature of 150° C., and the strand extruded through a small die opening of 3 mm φ attached to the extruder tip was cooled in a water bath, and cut by a pelletizer to produce resin particles having a particle weight of 8 mg. After charging 100 parts by weight of the resin particles, 300 parts by weight of water as a dispersion medium, 4.5 parts by weight of tribasic calcium phosphate as a dispersant, and 0.25 parts by weight and sodium n-paraffinsulfonate in a 10 L pressure tight vessel, 45 parts by weight of isobutane as a foaming agent was added thereto and stirred. After elevating the temperature such that the internal temperature of the vessel became 112° C. (to give the foaming temperature), the aqueous dispersion in the vessel being 2.7 MPa was released to an atmospheric pressure to permit expansion by passing through a nozzle with a small hole provided at the bottom of the pressure tight vessel downward. Accordingly, the thermoplastic polyester-based resin foamed particles having a small cell occupancy area ratio of 55%, an expansion ratio of 21 times, and having a crystal structure showing two melting points (136° C., 109° C.) on the DSC curve according to the differential scanning calorimetry method were obtained. The difference between the two melting points was as great as 27° C.

After air drying thus resulting thermoplastic polyester-based resin foamed particles, they were charged in a mold of 300×400×20 mm. To the mold was fed water vapor of 0.03 to 0.05 MPa (gauge pressure: equivalent to 107 to 115° C.), whereby the foamed particles were heated to permit fusion, and thus an in-mold foamed and molded product could be obtained irrespective of the cell diameter being small. The molded product was dried and cured, and thereafter, characteristics (expansion ratio, fusibility) of the molded product were determined. Measurement of the thermal conductivity of the resultant molded product gave a value of 0.0337 W/mK, revealing low thermal conductivity. Accordingly, the molded product was excellent in the thermal insulation property, with satisfactory fusibility, so that breaking at the boundary surface of the particles could not be caused at all. Also, the used thermoplastic polyester-based resin was biodegradable. The results of the measurement are shown in Table 1 together with the characteristics and the like of the foamed particles.

TABLE 1

| | | | | Characteristics of foamed particles | | | | Treatment | | Characteristics of mold | Thermal insulation property |
|---|---|---|---|---|---|---|---|---|---|---|---|
| | Resin Species | Bio-degrad-ability | Produc-tivity | Small cell occupancy area ratio | Ratio (time) | Tm1 (° C.) | Tm2 (° C.) | with internal pressure | Form-ability Fusibility | Ratio (time) | Thermal conductivity (W/mK) |
| Ex. 1 | PBAT | A | A | 55 | 21 | 136 | 109 | absent | A, | 18 | 0.0337 |
| Ex. 2 | PBAT | A | A | 55 | 21 | 136 | 109 | present | A, | 25 | 0.0330 |
| Ex. 3 | PBAT | A | A | 25 | 16 | 130 | 103 | absent | A, | 14 | 0.0356 |
| Ex. 4 | PBAT | A | A | 25 | 16 | 130 | 103 | present | A, | 18 | 0.0344 |

TABLE 1-continued

| | Resin Species | Characteristics of foamed particles | | | | | | Characteristics of mold | | | Thermal insulation property |
| | | Bio-degrad-ability | Produc-tivity | Small cell occupancy area ratio | Ratio (time) | Tm1 (° C.) | Tm2 (° C.) | Treatment with internal pressure | Form-ability Fusibility | Ratio (time) | Thermal conductivity (W/mK) |
|---|---|---|---|---|---|---|---|---|---|---|---|
| Ex. 5 | PHBH (HH rate 8%) | A | A | 75 | 15 | 150 | 128 | absent | A, formable | 14 | — |
| Ref. Ex. 1 | PBAT | A | A | 5 | 11 | 136 | 108 | absent | A, formable | 10 | 0.0429 |
| Ref. Ex. 2 | PP | C | — | 2 | — | — | — | — | A | 15 | 0.0419 |
| Ref. Ex. 3 | PP | C | — | 1 | — | — | — | — | A | 30 | 0.0407 |

Example 2

The foamed particles obtained in a similar manner to Example 1 except that the thermoplastic polyester-based resin foamed particles were subjected to a treatment with internal pressure (treatment of compression with a compression air at 2 kgf/cm$^2$ to increase the internal pressure of the foamed particles) were used. Upon allowing for fusion, an in-mold foamed and molded product could be obtained irrespective of the cell diameter being small. Measurement of the thermal conductivity of the resultant molded product gave a value of 0.0330 W/mK, revealing low thermal conductivity. Accordingly, the molded product was excellent in the thermal insulation property, with satisfactory fusibility, so that breakage at the boundary surface of the particles could not be caused at all. Also, the used thermoplastic polyester-based resin was biodegradable. The results of the measurement are shown in Table 1 together with the characteristics and the like of the foamed particles.

Example 3

The thermoplastic polyester-based resin foamed particles were obtained in a similar manner to Example 1 except that the foaming temperature was changed to 108° C., and the condition of the vessel was changed to give an internal pressure of 2.4 MPa. Accordingly, the thermoplastic polyester-based resin foamed particles having a small cell occupancy area ratio of 25%, an expansion ratio of 16 times, and having a crystal structure showing two melting points (130° C., 103° C.) on the DSC curve according to the differential scanning calorimetry method were obtained. The difference between the two melting points was as great as 27° C.

After air drying thus resulting thermoplastic polyester-based resin foamed particles, they were charged in a mold of 300×400×20 mm. To the mold was fed water vapor of 0.03 to 0.05 MPa (gauge pressure: equivalent to 107 to 115° C.), whereby the foamed particles were heated to permit fusion, and thus an in-mold foamed and molded product could be obtained irrespective of the cell diameter being small. The molded product was dried and cured, and thereafter, characteristics (expansion ratio, fusibility) of the molded product were determined. Measurement of the thermal conductivity of the resultant molded product gave a value of 0.0355 W/mK, revealing low thermal conductivity. Accordingly, the molded product was excellent in the thermal insulation property, with satisfactory fusibility, so that breaking at the boundary surface of the particles could not be caused at all. Also, the used thermoplastic polyester-based resin was biodegradable. The results of the measurement are shown in Table 1 together with the characteristics and the like of the foamed particles.

Example 4

The foamed particles obtained in a similar manner to Example 3 except that the thermoplastic polyester-based resin foamed particles were subjected to a treatment with internal pressure (treatment of compression with a compression air at 2 kgf/cm$^2$ to increase the internal pressure of the foamed particles) were used. Accordingly, an in-mold foamed and molded product could be obtained irrespective of the cell diameter being small. Measurement of the thermal conductivity of the resultant molded product gave a value of 0.0344 W/mK, revealing low thermal conductivity. Accordingly, the molded product was excellent in the thermal insulation property, with satisfactory fusibility, so that breaking at the boundary surface of the particles could not be caused at all. Also, the used thermoplastic polyester-based resin was biodegradable. The results of the measurement are shown in Table 1 together with the characteristics and the like of the foamed particles.

Example 5

For the thermoplastic polyester-based resin, using, as a microorganism, *Alcaligenes eutrophus* AC32 (Accession No. FERM BP-6038 (transferred from original deposit (FERM P-15786) deposited on Aug. 12, 1996), dated Aug. 7, 1997, National Institute of Advanced Industrial Science and Technology, International Patent Organism Depositary, address: Tsukuba Central 6, 1-1-1 Higashi, Tsukuba, Ibaraki, Japan; J. Bacteriol., 179, 4821 (1997)) prepared by introducing a PHA synthetic enzyme gene derived from *Aeromonas caviae* into *Alcaligenes eutrophus*, PHBH was produced by arbitrarily adjusting the raw material and culture conditions (PHBH (Mw=1,400,000) having a HH rate of 8% by mole). Thus produced PHBH was melt-kneaded with a ϕ35 mm single screw extruder (manufactured by Kasamatsu Kako Kenkyusho Inc., universal extruder for laboratory use) equipped with a kneader at a cylinder temperature of 160° C., and the strand extruded through a small die opening of 3 mm ϕ attached to the extruder tip was cut by a pelletizer to produce PHBH resin particles (Mw=800,000) having a particle weight of 5 mg. After charging 100 parts by weight of the resin particle, 300 parts by weight of water as a dispersion medium, 4.5 parts by weight of tribasic calcium phosphate as a dispersant, and 0.25 parts by weight of sodium n-paraffin sulfonate in a 10 L pressure tight vessel, 45 parts by weight of isobutane as a foaming agent was added thereto and stirred. During the vessel was kept in a state with the foaming temperature of 123° C., and the internal pressure of the vessel being 2.4 MPa, the aqueous dispersion was released to an ambient pressure to permit expansion by passing through a nozzle with a small hole provided at the bottom of the pressure tight vessel downward. Accordingly, the thermoplastic polyester-based resin foamed particles having a small cell occupancy area ratio of 75%, an expansion ratio of 15 times, and having a crystal structure showing two melting points (150° C., 128° C.) on the DSC curve according to the differential scanning calorimetry method were obtained. The difference between the two melting points was as great as 22° C.

After air drying thus resulting thermoplastic polyester-based resin foamed particles, they were charged in a mold of 300×400×20 mm. To the mold was fed water vapor of 0.25 to 0.30 MPa (gauge pressure: equivalent to 127 to 134° C.), whereby the foamed particles were heated to permit fusion, and thus an in-mold foamed and molded product could be obtained irrespective of the cell diameter being small. The molded product was dried and cured, and thereafter, characteristics (expansion ratio, fusibility) of the molded product were determined. The fusibility was satisfactory so that breaking at the boundary surface of the particles could not be caused at all. The used thermoplastic polyester-based resin was biodegradable. The results of the measurement are shown in Table 1 together with the characteristics and the like of the foamed particles.

Reference Example 1

The thermoplastic polyester-based resin foamed particles were obtained in a similar manner to Example 1 except that the foaming temperature was changed to 112° C., and 20 parts by weight of isobutane was added as the foaming agent, and that the internal pressure of the vessel was 1.7 MPa. Accordingly, the thermoplastic polyester-based resin foamed particles having a small cell occupancy area ratio of 5%, an expansion ratio of 10.6 times, and having a crystal structure showing two melting points (136° C., 108° C.) on the DSC curve according to the differential scanning calorimetry method were obtained. The difference between the two melting points was as great as 28° C.

After air drying thus resulting thermoplastic polyester-based resin foamed particles, they were charged in a mold of 300×400×20 mm. To the mold was fed water vapor of 0.03 to 0.05 MPa (gauge pressure: equivalent to 107 to 115° C.), whereby the foamed particles were heated to permit fusion, and thus an in-mold foamed and molded product was obtained. The molded product was dried and cured, and thereafter, characteristics (expansion ratio, fusibility) of the molded product were determined. Measurement of the thermal conductivity of the resultant molded product gave a value of 0.0429 W/mK, revealing high thermal conductivity. Accordingly, the molded product was inferior in the thermal insulation property, but the fusibility was satisfactory so that breaking at the boundary surface of the particles could not be caused at all. The results of the measurement are shown in Table 1 together with the characteristics and the like of the foamed particles.

Reference Example 2

The small cell area and the thermal conductivity of a commercially available molded product of polypropylene foamed particles (Eperan (registered trademark) PP) having an expansion ratio of 15 times were measured. The small cell occupancy area ratio was 2%, and the thermal conductivity was 0.0419 W/mK. It was inferior in thermal insulation property due to such a high thermal conductivity. In addition, the used polypropylene resin was not biodegradable. The results of the measurement are shown in Table 1.

Reference Example 3

The small cell area and the thermal conductivity of a commercially available molded product of polypropylene foamed particles (Eperan (registered trademark) PP) having an expansion ratio of 30 times were measured. The small cell occupancy area ratio was 1%, and the thermal conductivity was 0.0407 W/mK. It was inferior in thermal insulation property due to such a high thermal conductivity. In addition, the used polypropylene resin was not biodegradable. The results of the measurement are shown in Table 1.

INDUSTRIAL APPLICABILITY

According to the present invention, economic and easy-to-handle foamed particles can be obtained because it does not necessitate crosslinking agent which requires care in handling in steps of producing the foamed particles. In addition, a molded product which is extremely excellent in thermal insulation properties can be obtained using the foamed particles. The molded product is excellent in environmental compatibility and additionally biodegradable, and is also excellent in hydrolysis resistance, as well as friendly to the global environment.

The invention claimed is:

1. A thermoplastic polyester-based resin foamed particle having an occupancy rate of the cell diameter of equal to or less than 50 μm in an arbitrary two-dimensional cross section of the thermoplastic polyester-based resin foamed particle being equal to or greater than 20%.

2. The thermoplastic polyester-based resin foamed particle according to claim 1 wherein the thermoplastic polyester-based resin comprises a copolymer poly(3-hydroxyalkanoate) having a repeating monomer unit represented by the general formula (1):

$$[\text{---CHR---CH}_2\text{---CO---O---}] \tag{1}$$

wherein, R is an alkyl group represented by $C_nH_{2n+1}$; and n is an integer of 1 to 15, produced from a microorganism.

3. The thermoplastic polyester-based resin foamed particle according to claim 2 wherein the poly(3-hydroxyalkanoate) is poly(3-hydroxybutyrate)-co-3-hydroxyhexanoate).

4. The thermoplastic polyester-based resin foamed particle according to claim 3 wherein the composition ratio of the copolymerizing components of the poly(3-hydroxybutyrate-co-3-hydroxyhexanoate) is poly(3-hydroxybutyrate)/poly(3-hydroxyhexanoate) in a molar ratio=99/1 to 80/20.

5. A molded product of the foamed particles obtained by heat molding of the thermoplastic polyester-based resin foamed particles according to claim 1.

6. The molded product of the foamed particles according to claim 5 wherein the molded product of the foamed particles has a thermal conductivity of equal to or less than 0.040 W/mK.

7. The molded product of the foamed particles according to claim 6 wherein the molded product of the foamed particles has a thermal conductivity of equal to or less than 0.034 W/mK.

8. The thermoplastic polyester-based resin foamed particle according to claim 1 wherein the thermoplastic polyester-based resin is a thermoplastic polyester-based resin (X) predominantly comprising a copolymer (x) comprising a compound (a) containing an alkane carboxylic acid and/or an ester-forming derivative of the alkane carboxylic acid, a compound (b) containing an aromatic carboxylic acid and/or an ester-forming derivative of the aromatic carboxylic acid and an alkane diol compound (c).

9. The thermoplastic polyester-based resin foamed particle according to claim 8 wherein the compound (a) is adipic acid and/or an ester-forming derivative of adipic acid, the compound (b) is terephthalic acid and/or an ester-forming derivative of terephthalic acid, and the compound (c) is butanediol.

10. The thermoplastic polyester-based resin foamed particle according to claim 8 wherein the copolymer (x) is a thermoplastic polyester-based resin obtained by allowing a monomer (x1) that imparts a branched structure and/or a chain extender (x2) to react.

11. The thermoplastic polyester-based resin foamed particle according to claim 1 having an occupancy rate of the cell diameter of equal to or less than 50 µm in an arbitrary two-dimensional cross section of the thermoplastic polyester-based resin foamed particle being equal to or greater than 50%.

12. A method of producing the thermoplastic polyester-based resin foamed particles according to claim 1 comprising: a step of dispersing thermoplastic polyester-based resin particles in a water-based dispersion medium in an airtight vessel together with a dispersant; a step of feeding a foaming agent into the airtight vessel after the dispersion, followed by heating the resin particles to not lower than the softening temperature thereof; and a step of opening one end of the airtight vessel after the heating so as to release the resin particles and the water-based dispersion medium to an atmosphere with a pressure lower than the pressure in the airtight vessel.

* * * * *